US010019768B2

(12) United States Patent
Florance et al.

(10) Patent No.: US 10,019,768 B2
(45) Date of Patent: Jul. 10, 2018

(54) SYSTEMS AND METHODS FOR TRACKING, MARKETING, AND/OR ATTRIBUTING INTEREST IN ONE OR MORE REAL ESTATE PROPERTIES

(71) Applicant: CoStar Realty Information, Inc., Washington, DC (US)

(72) Inventors: Andrew Florance, Washington, DC (US); Curtis Ricketts, Washington, DC (US); Veera Srinivasan, Fairfax, VA (US)

(73) Assignee: CoStar Realty Information, Inc., Washington, DC (US)

( * ) Notice: Subject to any disclaimer, the term of this patent is extended or adjusted under 35 U.S.C. 154(b) by 674 days.

(21) Appl. No.: 14/634,192

(22) Filed: Feb. 27, 2015

(65) Prior Publication Data

US 2015/0248642 A1 Sep. 3, 2015

Related U.S. Application Data

(60) Provisional application No. 61/946,242, filed on Feb. 28, 2014.

(51) Int. Cl.
| | |
|---|---|
| *G06Q 50/16* | (2012.01) |
| *G06Q 10/10* | (2012.01) |
| *H04W 4/02* | (2018.01) |
| *H04W 4/80* | (2018.01) |

(52) U.S. Cl.
CPC ............ *G06Q 50/16* (2013.01); *G06Q 10/10* (2013.01); *H04W 4/02* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 6,624,742 | B1 * | 9/2003 | Romano | G06Q 50/16 340/12.5 |
| 6,636,803 | B1 * | 10/2003 | Hartz, Jr. | G06Q 10/10 701/454 |
| 6,751,596 | B1 * | 6/2004 | Hastings | G06Q 30/0201 705/37 |

(Continued)

OTHER PUBLICATIONS

International Search Report and Written Opinion cited in corresponding International Application No. PCT/US15/18097 dated Jun. 19, 2015.

(Continued)

*Primary Examiner* — Patrick McAtee
(74) *Attorney, Agent, or Firm* — Fish & Richardson P.C.

(57) ABSTRACT

Computer-implemented systems, methods, and computer-readable media for tracking interest in real estate property include receiving, by at least one of one or more computing devices, first information about one or more individuals that may be interested in a real estate property and at least one referral source, and detecting, by at least one of the one or more computing devices, second information indicating that the one or more individuals has visited at least one of the one or more real estate properties. The systems, methods and media of the present disclosure may include correlating, by at least one of the one or more computing devices, the first information with the second information and providing acknowledgement based at least in part on the correlation.

20 Claims, 13 Drawing Sheets

(56) References Cited

U.S. PATENT DOCUMENTS

| | | | | |
|---|---|---|---|---|
| 7,848,765 | B2* | 12/2010 | Phillips | G08B 21/0236 455/404.2 |
| 8,289,151 | B2 | 10/2012 | Koennecke et al. | |
| 8,311,845 | B2 | 11/2012 | Vengroff | |
| 8,335,488 | B2* | 12/2012 | Despain | G07C 9/00023 340/5.73 |
| 8,626,187 | B2* | 1/2014 | Grosman | H04M 1/72572 455/404.2 |
| 8,755,824 | B1* | 6/2014 | Wang | H04W 4/021 340/539.13 |
| 9,204,251 | B1* | 12/2015 | Mendelson | G08G 1/14 |
| 2002/0072930 | A1* | 6/2002 | Scites | G06Q 30/02 705/313 |
| 2002/0073331 | A1* | 6/2002 | Candelore | G06F 21/6245 726/3 |
| 2002/0077936 | A1* | 6/2002 | Wiese | G06Q 30/02 705/26.1 |
| 2002/0138485 | A1* | 9/2002 | Faudman | G06Q 10/06311 |
| 2004/0109452 | A1* | 6/2004 | Takihiro | H04L 12/1854 370/392 |
| 2005/0125408 | A1* | 6/2005 | Somaroo | G06F 17/30286 |
| 2006/0106628 | A1* | 5/2006 | Faherty | G06Q 30/06 705/313 |
| 2007/0185768 | A1* | 8/2007 | Vengroff | G06Q 30/02 705/14.64 |
| 2008/0186166 | A1* | 8/2008 | Zhou | G01S 5/0027 340/539.13 |
| 2008/0248815 | A1* | 10/2008 | Busch | H04W 4/02 455/456.5 |
| 2008/0281609 | A1 | 11/2008 | Marino | |
| 2008/0288336 | A1* | 11/2008 | Charuk | G06Q 10/10 705/7.35 |
| 2009/0079569 | A1* | 3/2009 | Salvat, Jr. | G01S 5/0027 340/572.1 |
| 2009/0284578 | A1 | 11/2009 | Carter | |
| 2011/0231255 | A1* | 9/2011 | Urbanski | G06Q 30/02 705/14.49 |
| 2011/0275441 | A1* | 11/2011 | Wilson | G06Q 50/16 463/42 |
| 2011/0301987 | A1 | 12/2011 | Wiese | |
| 2012/0172027 | A1* | 7/2012 | Partheesh | H04W 4/021 455/420 |
| 2012/0231814 | A1* | 9/2012 | Calman | G06Q 30/06 455/456.3 |
| 2013/0073388 | A1 | 3/2013 | Heath | |
| 2013/0131977 | A1* | 5/2013 | Dickson | G01C 21/343 701/428 |
| 2013/0217332 | A1* | 8/2013 | Altman | H04H 60/90 455/41.2 |
| 2013/0225282 | A1* | 8/2013 | Williams | A63F 13/216 463/29 |
| 2013/0260790 | A1* | 10/2013 | Itzhaki | H04W 4/02 455/456.1 |
| 2014/0026094 | A1* | 1/2014 | Zimmerman | G06F 3/0481 715/781 |
| 2014/0171013 | A1* | 6/2014 | Varoglu | H04W 4/021 455/404.2 |
| 2014/0188804 | A1* | 7/2014 | Gokhale | G06F 21/6218 707/645 |
| 2014/0232522 | A1* | 8/2014 | Schmidt-Lackner | G07C 9/00126 340/5.28 |
| 2014/0282048 | A1* | 9/2014 | Shapiro | G08B 25/14 715/741 |
| 2014/0304178 | A1* | 10/2014 | Bengson | G06Q 50/16 705/313 |
| 2015/0133168 | A1* | 5/2015 | Jay | H04W 4/02 455/456.3 |
| 2015/0141045 | A1* | 5/2015 | Qiu | H04W 4/021 455/456.1 |
| 2015/0142483 | A1* | 5/2015 | Bergdale | G06Q 10/02 705/5 |
| 2015/0161553 | A1* | 6/2015 | Eggleston | G06Q 10/06311 705/7.15 |

OTHER PUBLICATIONS

Betters., "Apple's iBeacons explained: What is it and why it matters," Sep. 18, 2013.

Boehret., "Oh the Places Your Phone Will Find," Dec. 3, 2013.

Spector, Nicole, "Drawbridge Syncs Up Advertisers' Analytics for Cross-Device Targeting," Oct. 6, 2014, GeoMarketing, 7 pages.

About iBeacon on your iPhone, iPad, and iPod touch [online]. "Learn how iBeacon determines your location in iOS 7 or later on your iPhone, iPad, and iPod touch," Jun. 14, 2016, [retrieved on Aug. 17, 2016]. Retrieved from the Internet: <URL: https://support.apple.com/en-us/HT202880>. 2 pages.

Kastrenakes, Jacob, "Philips takes on Apple's iBeacon with lights that send deals to your smartphone," Feb. 17, 2014, The Verge, 4 pages.

Canadian Office Action in Canadian Application No. 2940966, Dated Feb. 26, 2018, 4 pages.

Ben Howden, Blue tooth LE Beacons for galleries and museums, Dec. 30, 2013.

U.S. Office Action in U.S. Appl. No. 15/241,912, dated May 17, 2018, 21 pages.

* cited by examiner

SYSTEMS AND METHODS FOR TRACKING, MARKETING, AND/OR ATTRIBUTING INTEREST IN ONE OR MORE REAL ESTATE PROPERTIES

RELATED APPLICATION DATA

This application claims priority to U.S. Patent Application No. 61/946,242, filed Feb. 28, 2014 and entitled "REAL ESTATE ATTRIBUTION METHOD AND APPARATUS," which is hereby incorporated by reference in its entirety.

BACKGROUND

Real estate is an immensely competitive and complex industry. Many types of intermediaries, such as real estate agents, serve as referral sources. In an attempt to gain a competitive edge in the market, systems and methods have been developed to track visits to real estate property.

For example, U.S. Application Publication No. 2011/0301987 (Weise) attempts to track an actual "drive-by" of a real estate property to provide an indicator of interest by a potential purchaser. As shown in FIG. 1, reproduced from Weise, the system utilizes signals, such as those received from a cell phone 22 or Global Positioning System (GPS) unit of a potential purchaser, to determine the location of that individual, and the frequency, duration and proximity of visits to a location of real estate property for sale. If the cell phone 22 is determined to be within a minimum distance of the real estate property listed for sale, Weise discloses that the information is recorded.

As another example of the prior art, U.S. Pat. No. 8,311,845 (Vengroff) discloses an advertising system based on visits to a physical location. Vengroff teaches a step of confirming that a user visited a business by the exchange of a signal between a mobile device and one or more beacon devices installed on the premises.

BRIEF DESCRIPTION OF THE DRAWINGS

It should be understood that the drawings and description are not intended to be limiting to the particular form disclosed. Rather, the present disclosure covers all modifications, equivalents and alternatives falling within the spirit and scope of the appended claims. The foregoing summary, as well as the following detailed description of the invention, will be better understood when read in conjunction with the appended drawings. For the purpose of illustrating the disclosure, there are shown in the drawings various illustrative embodiments. It should be understood, however, that the disclosure is not limited to the precise arrangements and instrumentalities shown. In the drawings:

DETAILED DESCRIPTION

Figure 1:
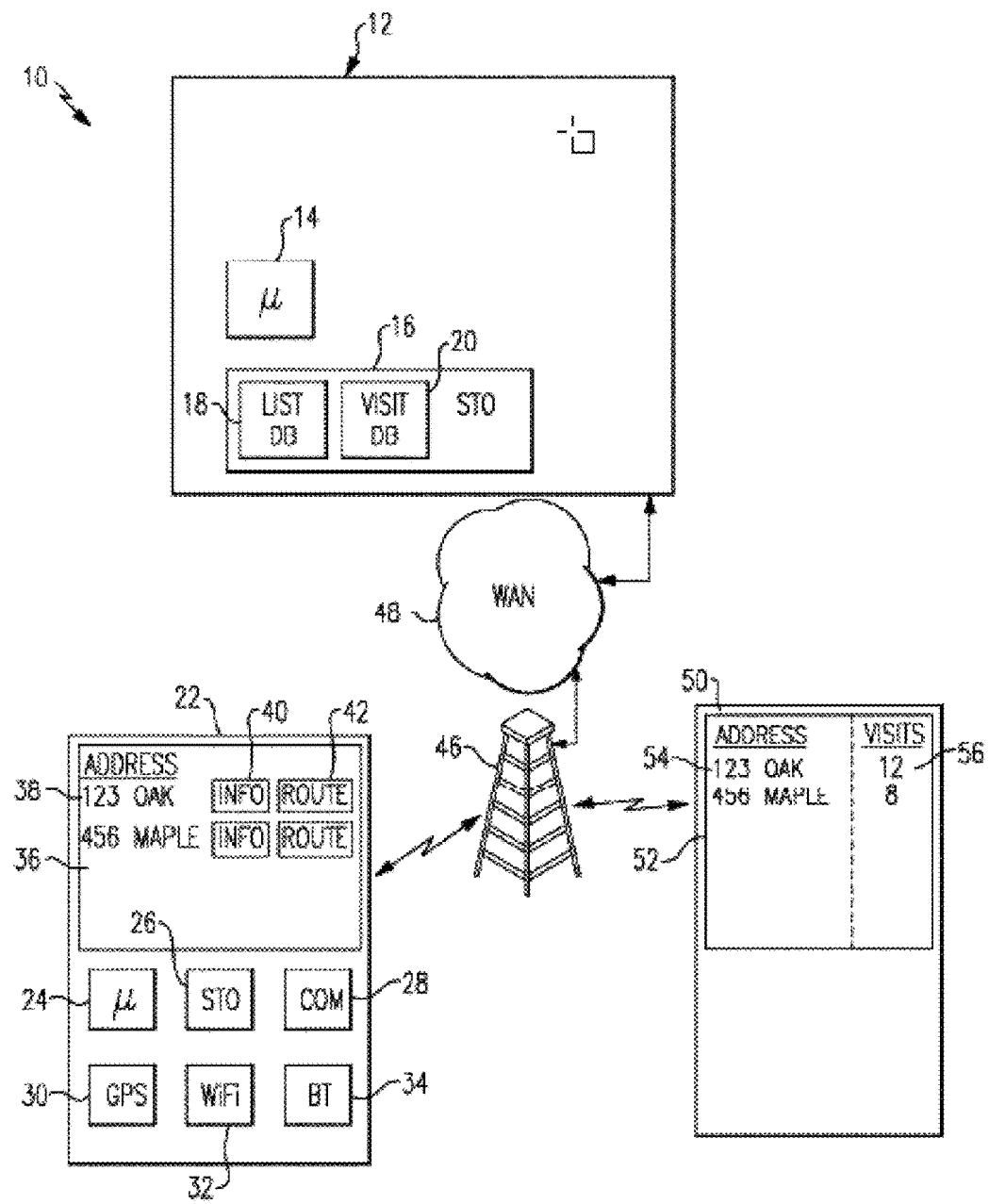
FIG. 1 is a schematic diagram of a tracking system according to the prior art.

While systems and methods are described herein by way of example and embodiments, those skilled in the art recognize that systems and methods for tracking interest, marketing, and/or attributing interest in one or more real estate properties are not limited to the embodiments or drawings described. Any headings used herein are for organizational purposes only and are not meant to limit the scope of the description or the claims. Certain terminology is used in the following description for convenience only and is not limiting. As used herein, the word "may" is used in a permissive sense (e.g., meaning having the potential to) rather than the mandatory sense (e.g., meaning must). Similarly, the words "a," "an" and "the" mean "at least one," and the words "include," "includes" and "including" mean "including, but not limited to."

Known systems and methods fail to provide attribution to a real estate agent or other referral source, for example, when an individual physically visits a particular property. The system and methods of the present disclosure accomplish the above and additional objectives. The inventors have found that it would be desirable to correlate first information about if, when, where and/or how an individual is provided details about or notice of a property and/or about the referral source with second information about if and/or when that same individual physically visits the property. The inventors have also found that it would be desirable to give credit or provide attribution to the referral source that initiated or caused an individual to physically visit a real estate property.

The systems and methods of the present disclosure may direct or lead potential purchasers, renters or leasers, for example, to one or more real estate properties. The term "real estate property" may be broadly defined herein as any land and/or one or more buildings or physical structures thereon, such as a house, apartment, commercial retail space, etc. The systems and methods of the present disclosure may also market and highlight relevant or desirable features (e.g., points-of-interest) of the properties, and may be employed in the residential and/or commercial real estate industries.

The systems and methods of the present disclosure may identify such individual(s) to one or more real estate agents, other referral sources, and/or owners or sellers, and may provide attribution to the referral source, for example. Attribution may be given to a particular referral source, for example, if and/or when the individual(s) identified the particular real estate property or properties on a specific website, and/or if the real estate agent or other referral source sent (electronically or otherwise) the individual(s) information about the property.

The systems and methods of the present disclosure "closes-the-loop" on attribution, or connects a particular online search to a real-world visit, which the prior art fails to accomplish. The present disclosure may provide attribution in one or more of a variety of ways. For example, the systems and methods of the present disclosure may create a record or report to provide attribution, indicate that a particular correlation, connection, match or link was made, such as producing an image of a gold star on a website next to the referral source's profile, and/or automatically send out an email (e.g., to the referral source, a supervisor, a media publication or members of a particular industry) providing notification of the correlation.

Figure 2:
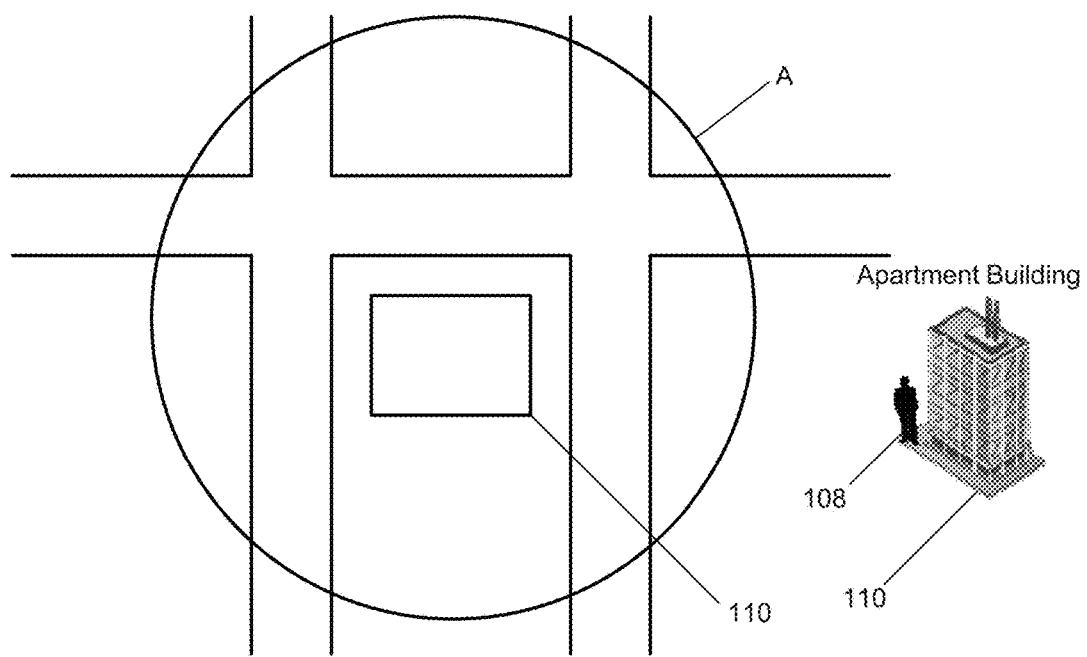
FIG. 2 is a schematic diagram depicting the approximate precision of a prior art Global Positioning System (GPS)
Figure 3:
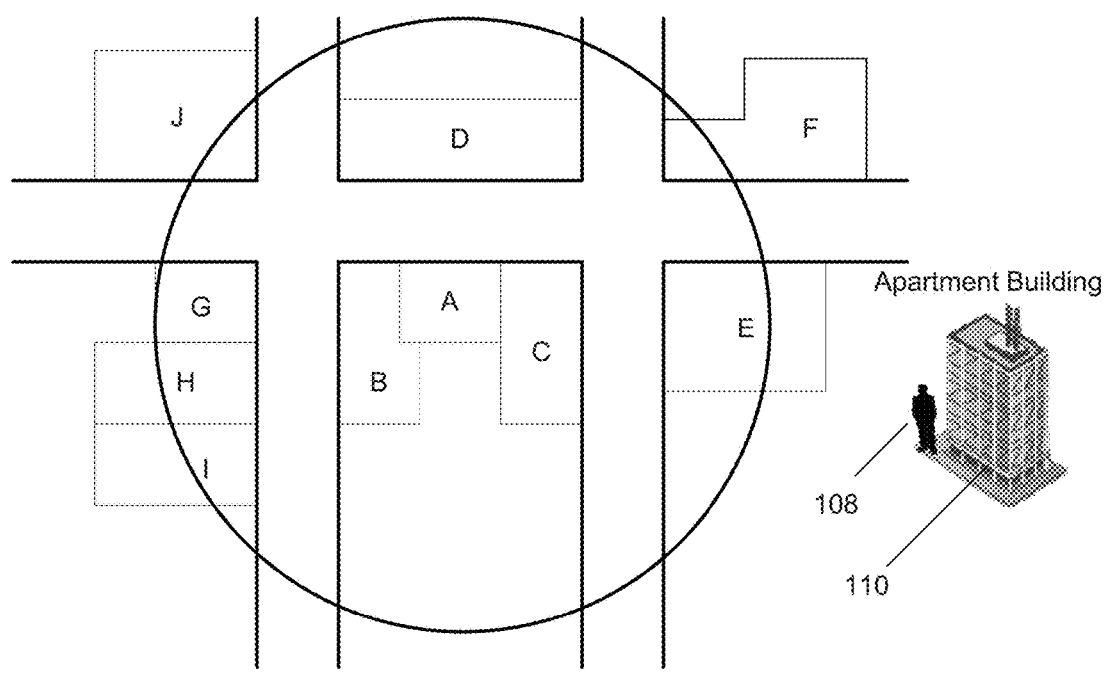
FIG. 3 is another schematic diagram depicting the approximate precision of a prior art GPS.

One parameter that the present disclosure focuses on is concise location of the individual seeking a real estate property. This may be in terms of absolute position (e.g., geographic coordinates, such as longitude and latitude) or a position relative to something else (e.g., a home or apartment near a particular amenity, such as a commuter train station). A drawback of prior art GPS is that they often are not particularly precise in identifying a location, especially in dense urban environments where precision or accuracy are very important. For example, prior art GPS often identifies locations on cellular phone that are not sufficiently accurate for at least certain purposes. As shown in FIG. 2, even if GPS identifies an individual 108 as being located within the area A, the GPS may not be capable of identifying or determining if the individual actually visited the real estate property 110. In more densely packed urban areas, such as that shown in FIG. 3, an individual who may have entered Building E would have may have met the GPS geographic criteria for having "visited" Building A, when in fact the individual may have been a certain distance away from Building A and may not have entered Building A. Therefore, it is desirable to improve upon prior art GPS.

Figure 4:
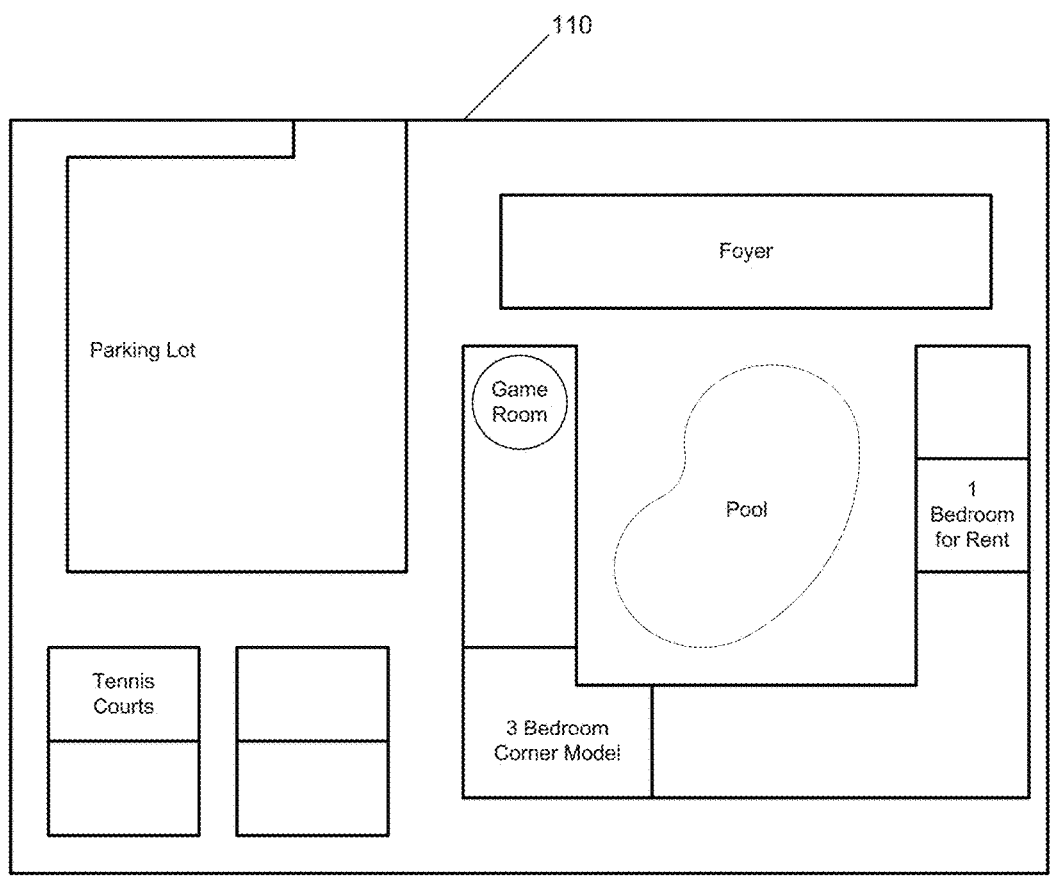
FIG. 4 is a schematic diagram of a real estate property.

Another parameter that the present disclosure focuses on is relative location. For example, if a real estate agent or other referral source is only concerned with whether an individual enters a particular building, then the real-world coordinates of the building are irrelevant as long as the referral source is notified once the individual enters the building. Referral sources, owners and sellers may not be interested in whether an individual drove or walked by a particular property, but whether that individual actually entered or stepped onto/into the property. In particular, referral sources, owners and sellers may be particularly interested in which parts of the property the individual (e.g., the potential buyer or renter) observed or viewed. For example, as shown in FIG. 4, it is valuable to know if an individual that visited a real estate property only visited the leasing office in the foyer, or whether they visited one or more other rooms or aspects of the property, such as a game room, a pool or particular bedroom.

Figure 5:
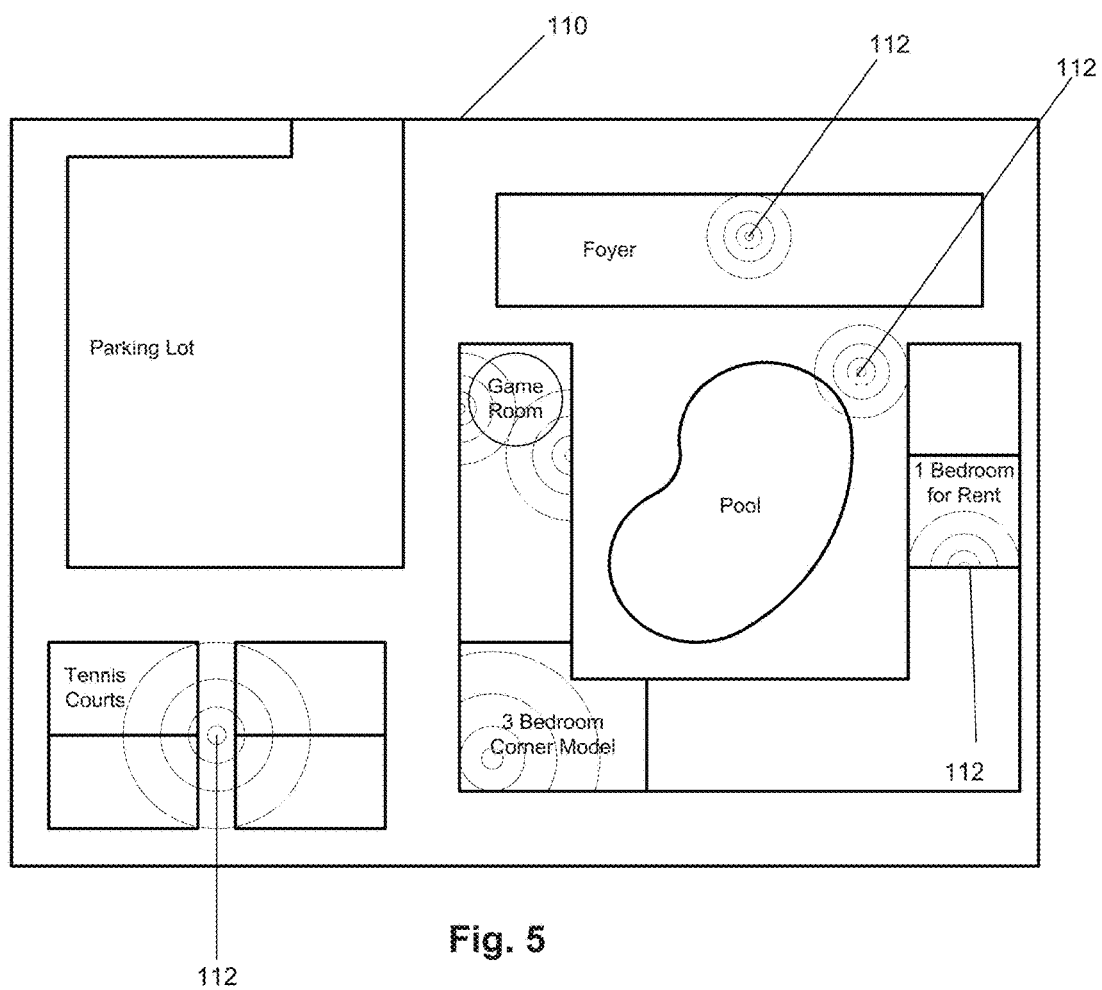
FIG. 5 is a schematic diagram of a system of tracking, marketing and/or attributing interest in real estate according to the present disclosure.

As shown in FIG. 5, to track, monitor and/or attribute interest, movement or visits described above, the present disclosure may employ at least one and possibly a plurality of spaced-apart transmitters, generally designated 112, at one or more specific locations in, on and/or around one or more real estate properties 110. The term "transmitter" may be broadly defined herein as any device that sends and/or receives an electronic signal. Examples of a transmitter are a beacon, a sensor and/or an emitter. Each transmitter 112 may come in any one of a variety of forms, including light bulb embedded beacons from Phillips, and iBeacons™ from Apple. One or more of the transmitters 112 may include radar reflectors, radio beacons, sonic and/or visual signals. Each transmitter 112 may employ and/or interact with one or more Near Location-Based Services (NLBS), in which local-range technologies, such as Bluetooth, WLAN, infrared and/or RFID/Near Field Communication technologies, are used. The strength of one or more signals emitted and/or received by each transmitter may be adjusted, as desired.

Figure 6:
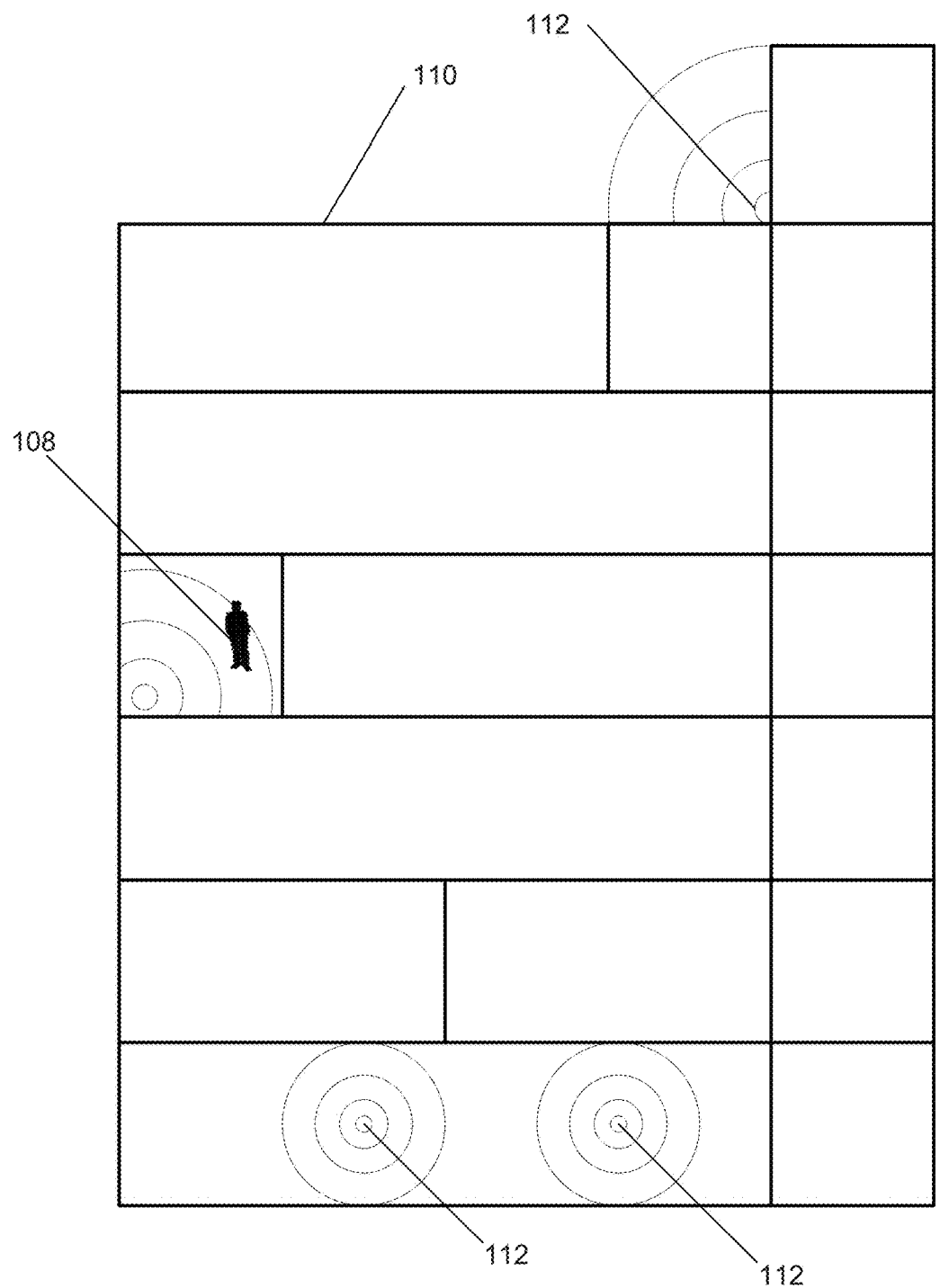
FIG. 6 is another schematic diagram of a system according to the present disclosure.

The transmitters 112 may be able to detect and/or monitor either or both horizontal movement, such as that depicted in FIG. 5, and vertical movement, such as that depicted in FIG. 6, on or in a real estate property 110. Prior art phone-based GPS cannot be relied upon for this combination of measurement. The multi-story building shown in FIG. 6 could be fully covered on all floors and/or spaces by the signal(s) of the transmitter(s) 112. Alternatively, only certain spaces of the building may be sensed or monitored by the transmitter(s) 112. Each transmitter 112 may emit a signal regardless of whether an individual is within range, and may be placed in an inconspicuous location, such as behind or beneath furniture or on a wall or a ceiling, on or within the real estate property 110. One or more of the transmitters 112 may be placed exterior of a building on the real estate property 110 (see FIG. 6), and/or one or more of the transmitters 112 may be placed within a building on the real estate property 110 (see FIGS. 5 and 6).

The present disclosure is also able to identify at least certain visitors to the one or more real estate properties 110. For example, the present disclosure is capable of tying and/or linking an individual 108 that visited or viewed a particular website or computer application, or otherwise received or was provided information about a property, to an individual 108 that physically visits, enters and/or arrives at the one or more real estate properties 110. The identification can be accomplished on at least one of several levels, and each level has (albeit different) value. For example, at least one embodiment of the present disclosure is able to identify and/or determine whether the individual 108 who viewed a particular real estate property on a website or application is the same individual 108 that arrived at and/or physically toured at least a portion of the real estate property 110. Additionally, the present disclosure may identify certain characteristics of the individual described above, such as their name, email address, mobile phone number, current address, etc., and report such information to a referral source or property owner, for example.

The present disclosure may function in any one of the following non-limiting, exemplary scenarios. An individual may search a real estate website via a web browser, from a desktop computer, a laptop computer, a tablet computer or a smartphone, for example. During the search of the website, the user may or may not register or create a profile with the website. The term "register" may be broadly defined herein as providing or inputting, overtly or implicitly, at least one piece of information about the individual 108, such as a name, an email address, an area code, or numeric key. Alternatively, the individual 108 may download a particular application to a mobile device, for example. The download may typically be done through a tablet or cellular telephone, but the download could be accomplished through any of a number of electronic devices, such as a watch, glasses, a bracelet, clothing or some other electronically-connected device. When downloading the application, the individual 108 may first search for the application (via entry of keywords, for example), but not register or otherwise identify themselves to the application. Alternatively, the individual may register with the application by inputting one or more pieces of information about themselves, such as their name, into the application.

The one or more applications of the present disclosure may employ or interact with one or more Location-Based Services (LBS), such as control plane locating, GMS localization, self-reporting positioning, etc., so that the system can be aware of the individual's 108 location. Through the mobile device's Wi-Fi receiver or other NLBS, the mobile device's location can be identified and enhanced, using widely available third party services, and compared to conventional GPS signal location. By combining the above with one or more of the transmitters 112, as described above, on or in the real estate property, very reliable and precise location information can be achieved. The Wi-Fi receiver or other NLBS of the mobile phone may be activated in any of a variety of ways. For example, the Wi-Fi receiver or other NLBS of the mobile phone may be turned-on by the individual 108, or the individual 108 may grant permission for the application to do so.

The systems and methods of the present disclosure can identify the location of each transmitter 112, and can measure relative placements of each transmitter 112. Each transmitter 112 may be registered with and/or monitored by a central location database as a single transmitter 112 or one or more groups of related transmitters 112 at the one or more real estate properties. Sensitivity of each transmitter 112 can be tuned as transmission signals can be attenuated to different levels and ranges. Relative strength levels and triangulation from multiple transmitters 112 can be used to focus location to incredible accuracy. With these features, the present disclosure provides very accurate micro-location based geo-fencing.

Figure 7:
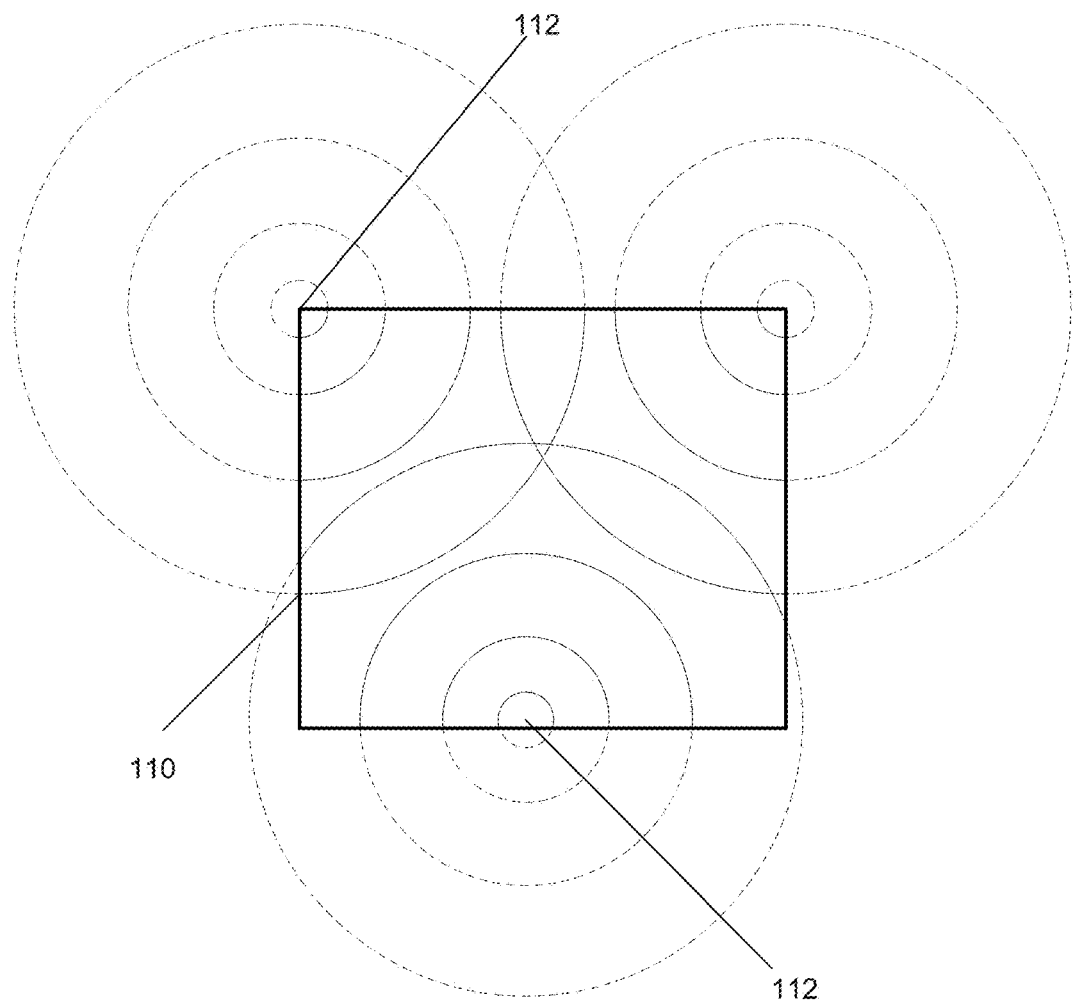
FIG. 7 is a schematic diagram of an example of a multi-transmitter installation according to the present disclosure.
Figure 8:
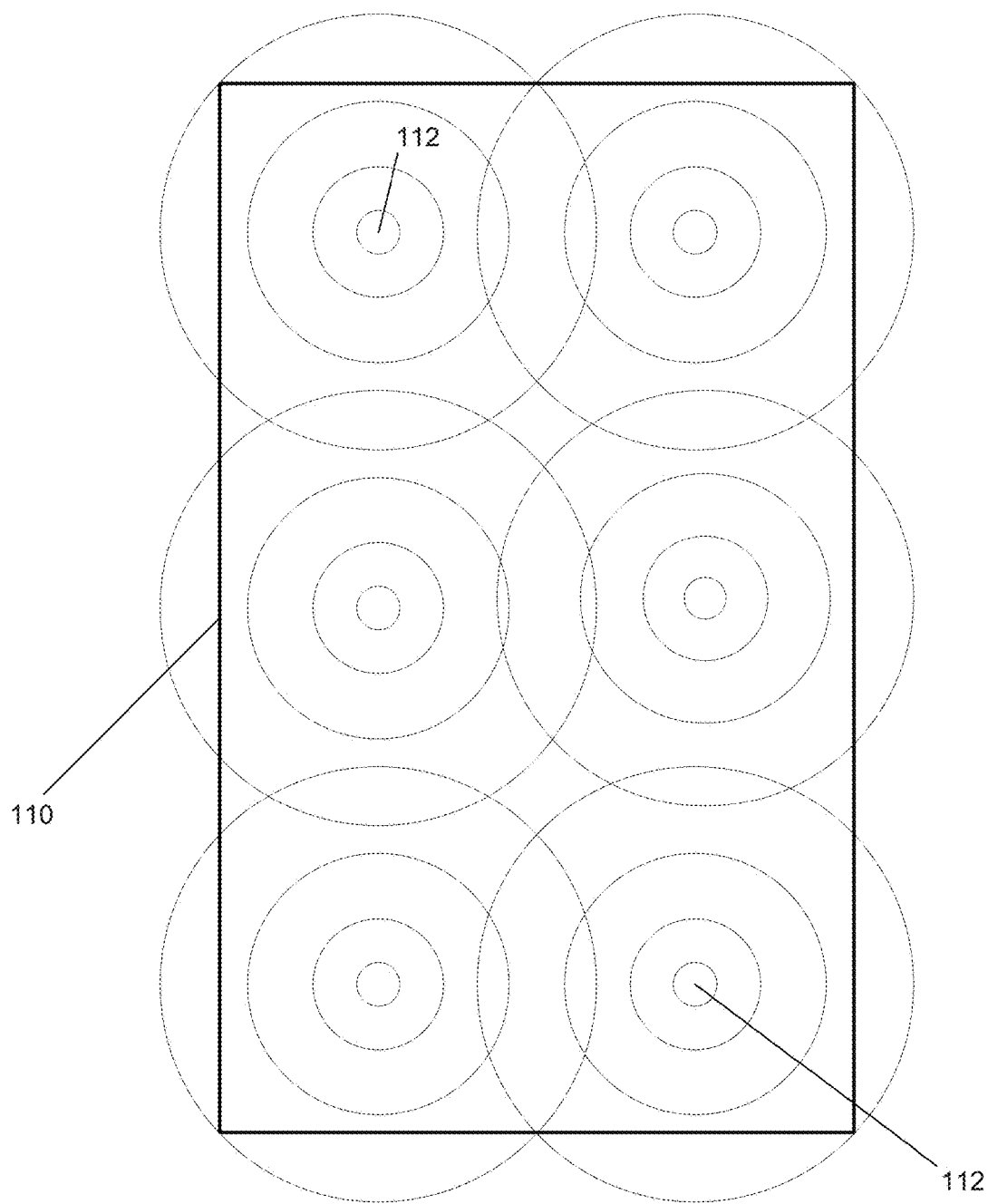
FIG. 8 is a schematic diagram of another example of a multi-transmitter installation according to the present disclosure.

FIGS. 7 and 8 show examples of multi-transmitter 112 installations according to the present disclosure. In particular, FIG. 7 is a top plan view of a floor of a real estate property 110 that includes three spaced-apart transmitters 112. FIG. 8 is a top plan view of a floor of a real estate property 110 that includes six spaced-apart transmitters. The geo-fence may be defined by the combination of the outermost or furthest signal of each transmitter 112. Alternatively, the geo-fence may be configured to include only a specific area, such as the outer walls or outer periphery of the real estate property 110, or only one or two rooms of the real estate property 110.

In operation, once the NLBS is activated, one or more mobile devices within a particular geographic location may receive one or more signals from one or more transmitters 112. Because each transmitter 112 may have a known location in a particular building or on a particular property, the application can know, with certainty, when a particular mobile device (and the individual 108 carrying that mobile device) has at least approached and possibly crossed into a micro-location geo-fenced area. In addition, the application may be able to detect and provide exact position records of the individual via the signal(s) received from the mobile device.

Based upon the above, at least one of several different categories of actions can be triggered. For example, the present disclosure may report information about the individual or visitor of the real estate property to a referral source or a property owner, for example. In particular, the system of the present disclosure may provide or report back the individual's 108 email address, the date and time that the individual 108 visited one or more of the real estate properties, the length of the individual's 108 visit, the number of times the individual has visited a particular website or application, whether the individual 108 has visited or viewed other real estate properties, etc.

Figure 9:
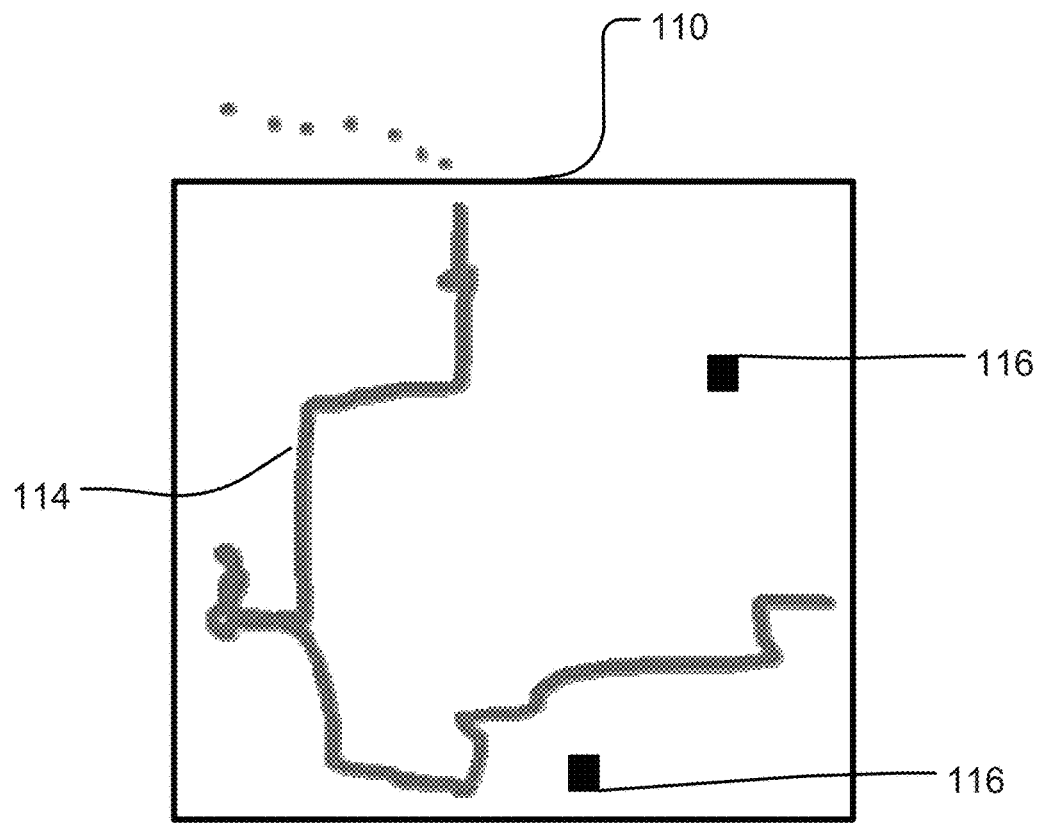
FIG. 9 is a schematic diagram representing a path of a first individual, such as a visitor or potential purchaser, on or within a real estate property.

The system of the present disclosure may automatically create a guest card and/or a tour record for a particular real estate property. The information presented could include that a visit occurred, the date and time of the visit, how long the visit lasted, exactly where on or within the real estate property the tour occurred (depending upon the number and placement of transmitters 112), etc. As shown in FIG. 9, the system may include one or more cameras 116 (still or video) operatively connected to or in communication with one of more of the transmitters 112. The camera(s) 116 would allow one or more images of the visitor(s) to be synched or linked with one or more other aspects of the system, such as but not limited to the prospective customer's information, a particular referral source or greeter at the property 110. One or more of the cameras 116 may be motion-activated.

Figure 10:
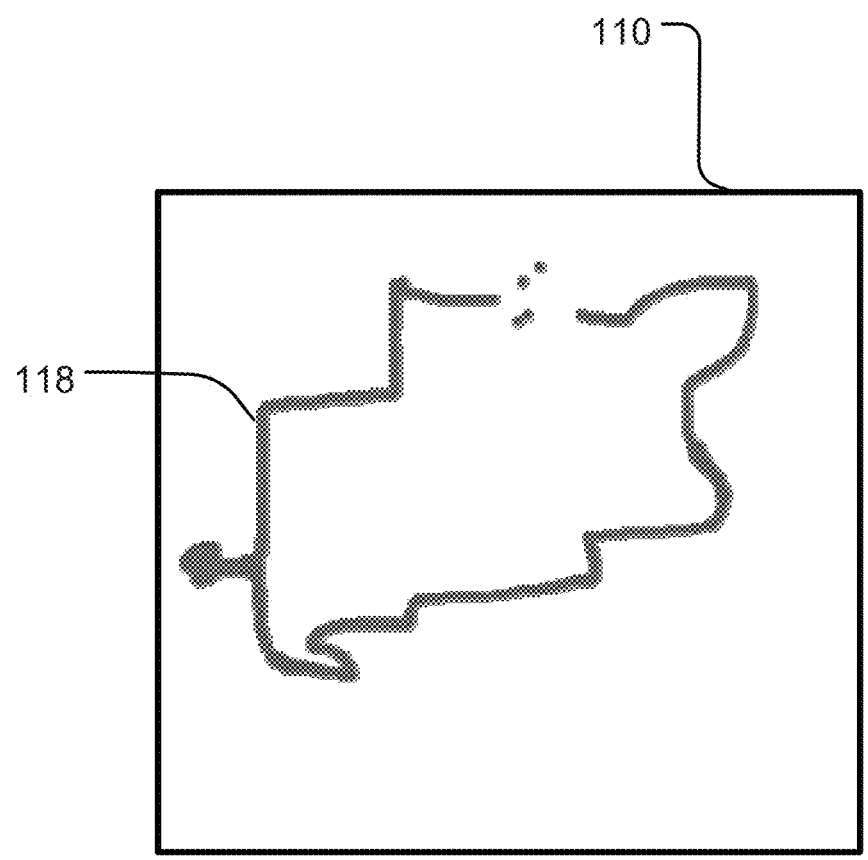
FIG. 10 is a schematic diagram representing a path of another individual, such as a referral source, on or within a real estate property.
Figure 11:
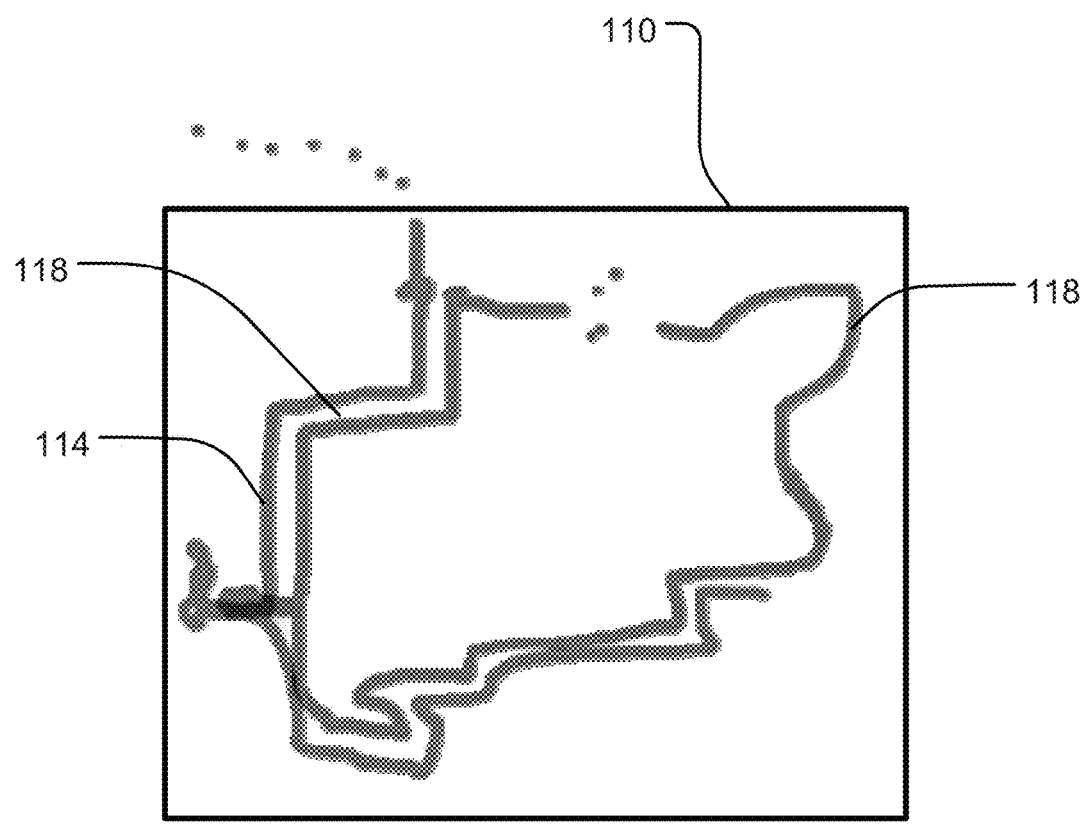
FIG. 11 is a schematic diagram overlaying or correlating the paths of the individuals shown in FIGS. 9 and 10.

The mobile application provided to the referral source and/or marketing staff could also utilize one or more of the transmitters 112 to report time and/or location, so that pattern matching for a very finite population can occur. For example, a prospective tenant touring a real estate property 110 could be matched or linked with a referral source of the property 110 accompanying the tour. As shown in FIG. 9, the system may produce or generate a diagram of a path 114 of the individual or visitor with the mobile application when on or in the real estate property 110. The path 114 may include certain features to highlight or identify different aspects of the individual's visit to the property. For example, as shown in FIG. 9, a dotted line may be used to indicate when the individual is within a particular distance to at least a portion of the real estate property 110, such as the front door thereof. A solid line may be used to indicate once the individual is within or on the real estate property 110. Time and/or date references may be added or embedded in the path 114. As show in FIG. 10, the system may produce a diagram of a path 118 of a referral source for the property 110 for the same time frame or period used to create the path 114 of FIG. 9. The system of the present disclosure may automatically correlate, match or overlay the two paths 114, 118 in both space and time, thereby creating a connection between a visitor and the referral source, as shown in FIG. 11.

When an individual 108 with a mobile device containing the application approaches, enters or steps-on the real estate property 110, the system may automatically send the individual 108, via the mobile device, the host real estate agent's contact information, such as an electronic business card (e.g., Vcard), points-of-interest information about particular amenities of the real estate property 110, and/or other information. The system may be capable of guiding the individual 108 around or through the real estate property 110, via the application on the mobile device, such that the individual 108 receives a guided tour, with points-of-interest features audibly and/or visually presented in synchronization with their location on or within the real estate property 110. If the individual 109 does not have the application loaded on their mobile device, their accompanying tour guide (e.g., the real estate agent or other referral source) could have the same location-synchronized mini presentations available to share with the visitor on the guide's tablet, mobile device or other computing system. The leasing/marketing staff of the real estate property 110 could also communicate incentives to the individual 108, such as to apply for a lease (through the application) or sign a contract (through the application), while the individual is on-site or in-site at the real estate property 110. Such a step could occur either at a predefined point in the tour, or when the tour guide sensed that the individual 108 was prepared to apply for the lease or sign a contract, for example.

When leaving the real estate property 110, and/or at a predetermined interval thereafter, the system could prompt the application to ask the individual 108 to answer one or more questions and/or participate in a survey of the real estate property 110, the tour, and/or the staff. Metrics received or collected by the system could be aggregated, analyzed and/or provided to the owner or the agent, for example, of the real estate property 110. Thus, the system of the present disclosure provides a convenient way to review or rate the real estate agent's activities, productivity and/or success rates, and can be presented and/or compared across various real estate properties 110 and/or real estate agents.

The present disclosure also provides a way to track, market and/or attribute interest in real estate in the scenario where an individual 108 searches a website, such as from a laptop or desktop, browses a listing for one or more real estate properties 110, but does not register with the website or otherwise overtly provide identifying information. In such a scenario, the system is able to place or drop, via a server, for example, a relatively small amount of data (e.g., a "cookie") onto or into the individual's web browser. As a result, there will be a unique identification for that individual 108 and their web-session information. The data can be stored, and may include a variety of information, such as date and time, duration of browsing of the website, search parameters that the individual entered, real estate properties returned, real estate properties viewed. Advertising networks and big data analytic companies, such as Drawbridge of San Mateo, Calif., are able to match online web sessions and mobile devices. Alternatively, the system of the present disclosure may employ location data delivery models, such as Location-as-a-Service (LaaS) provided by Locaid, to match or link online activity by the individual 108 with the individual's 108 visit(s) to the real estate property 110.

Figure 12:
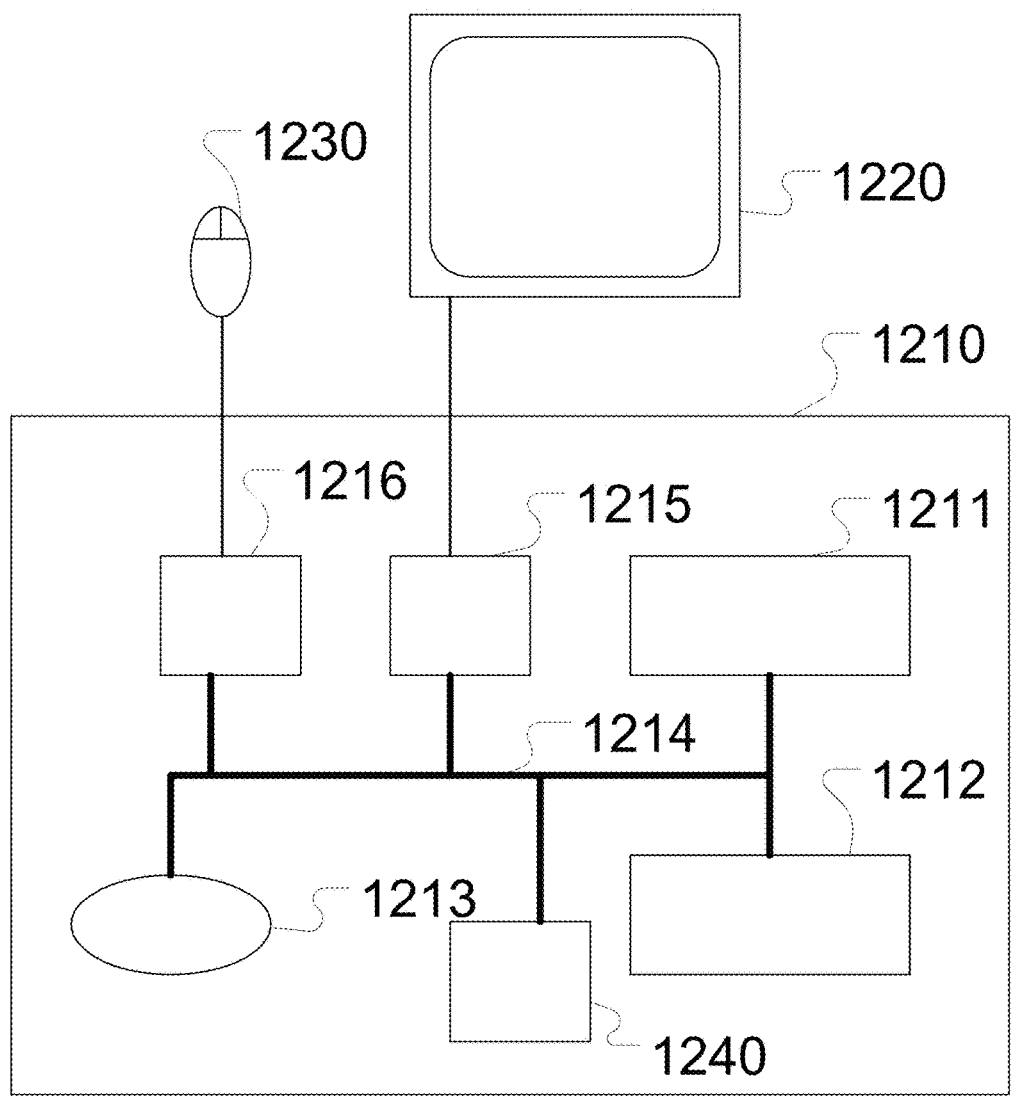
FIG. 12 shows an exemplary computing device useful for performing processes disclosed herein.

One or more of the above-described systems and/or methods may be implemented with or involve software, for example modules executed on or more computing devices 1210 (see FIG. 12). Of course, modules described herein illustrate various functionalities and do not limit the structure or functionality of any embodiments. Rather, the functionality of various modules may be divided differently and performed by more or fewer modules according to various design considerations.

Each computing device 1210 may include one or more processing devices 1211 designed to process instructions, for example computer readable instructions (i.e., code), stored in a non-transient manner on one or more storage devices 1213. By processing instructions, the processing device(s) 1211 may perform one or more of the steps and/or functions disclosed herein. Each processing device may be real or virtual. In a multi-processing system, multiple processing units may execute computer-executable instructions to increase processing power. The storage device(s) 1213 may be any type of non-transitory storage device (e.g., an optical storage device, a magnetic storage device, a solid state storage device, etc. The storage device(s) 1213 may be removable or non-removable, and includes magnetic disks, magnetic tapes or cassettes, CD-ROMs, CD-RWs, DVDs, or any other medium which can be used to store information. Alternatively, instructions may be stored in one or more remote storage devices, for example storage devices accessed over a network or the internet.

Each computing device 1210 additionally may have memory 1212, one or more input controllers 1216, one or more output controllers 1215, and/or one or more communication connections 1240. The memory 1212 may be volatile memory (e.g., registers, cache, RAM, etc.), non-volatile memory (e.g., ROM, EEPROM, flash memory, etc.), or some combination thereof. In at least one embodiment, the memory 1212 may store software implementing described techniques.

An interconnection mechanism 1214, such as a bus, controller or network, may operatively couple components of the computing device 1210, including the processor(s) 1211, the memory 1212, the storage device(s) 1213, the input controller(s) 1216, the output controller(s) 1215, the communication connection(s) 1240, and any other devices (e.g., network controllers, sound controllers, etc.). The output controller(s) 1215 may be operatively coupled (e.g., via a wired or wireless connection) to one or more output devices 1220 (e.g., a monitor, a television, a mobile device screen, a touch-display, a printer, a speaker, etc.) in such a fashion that the output controller(s) 1215 can transform the display on the display device 1220 (e.g., in response to modules executed). The input controller(s) 1216 may be operatively coupled (e.g., via a wired or wireless connection) to an input device 1230 (e.g., a mouse, a keyboard, a touch-pad, a scroll-ball, a touch-display, a pen, a game controller, a voice input device, a scanning device, a digital camera, etc.) in such a fashion that input can be received from a user.

The communication connection(s) 1240 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 12 illustrates the computing device 1210, the output device 1220, and the input device 1930 as separate devices for ease of identification only. However, the computing device 1210, the display device(s) 1220, and/or the input device(s) 1230 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The computing device 1210 may be one or more servers, for example a farm of networked servers, a clustered server environment, or a cloud services running on remote computing devices.

Figure 13:
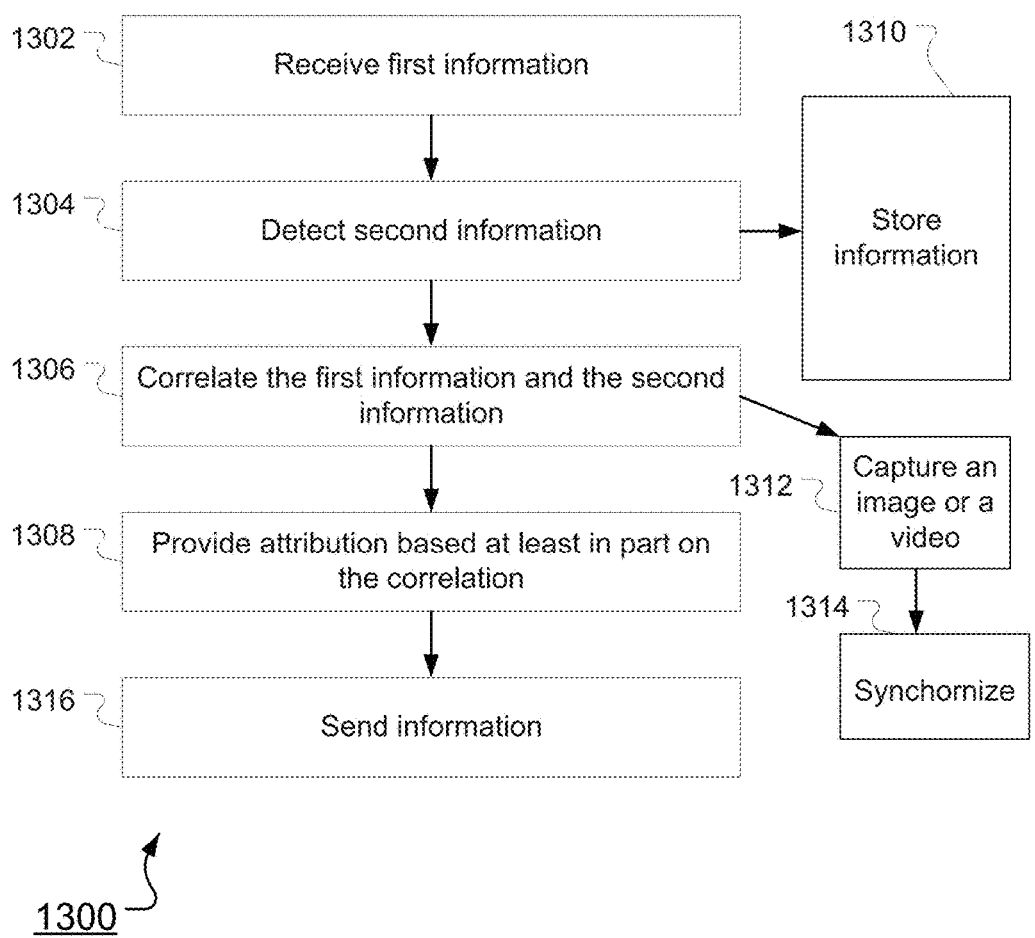
FIG. 13 is a schematic diagram of method of tracking, marketing and/or attributing interest in real estate according to the present disclosure.

FIG. 13 shows a non-limiting example of a method 1300 according to the present disclosure for tracking interest in one or more real estate properties 110. The method may include receiving, by at least one or more computing devices, first information about one or more individuals that may be interested in a real estate property and at least one referral source (step 1302), and detecting, by at least one of the one or more computing devices, second information indicating that the one or more individuals has visited at least one of the one or more real estate properties (step 1304). The method may also include correlating, by at least one of the one or more computing devices, the first information with the second information (step 1306) and providing attribution or acknowledgement based at least in part on the correlation (step 1308). The term "acknowledging" is broadly defined herein, and may include crediting, providing or paying a finder's fee, annotating or adding an entry to a record log or employee record, generating an advertisement or other notification, and/or sending a thank you note or email.

Prior to step 1302, the system or another entity or person may provide information about the one or more real estate properties 110. This information may be provided or received by the individual 108 in any one of a variety of ways, such as utilizing or employing a website with information about one or more real estate properties 110, sending a text or email message, tweeting a message or posting a message on a social media site, such as Facebook®, about one or more real estate properties 110. In one non-limiting embodiment, the system of the present disclosure may not provide (or cause to be provided) such information to potential customers or clients. Instead, the system may simply be apprised of and/or receive at least certain information, such as the existence or identity of one or more individuals 108 that may be interested in one or more real estate properties and/or identification of the one or more referral sources that provided the information.

Step 1302 may be accomplished in any one of a variety of ways, such as placing a "cookie" on a web browser of an individual 108 that viewed a particular website or downloaded a particular mobile application, monitoring activity or hits of a particular website or mobile application, and/or receiving registration information from a website or a mobile application. The information, or any portion thereof, received in step 1302 may be referred to herein as "the first information."

Step 1304 may further include receiving, by at least one of the one or more computing devices, a signal from one or more transmitters located on or within at least one of the one or more real estate properties, and identifying, by at least one of the one or more computing devices, a location of each of the transmitters for which a signal was received. The second information detected in step 1304 may include at least one of a date that each signal was first received, a time of day that each signal was first received, duration of time that the signal was received from each transmitter, and/or whether the signal received was also received on one or more previous dates.

The method may further include storing information regarding the second information and/or each of the received signals in a dataset (step 1310), and/or capturing, via a camera operated by at least one of the one or more computing devices, one of an image and a video of at least a portion of the one or more real estate properties for each signal received from one of the one or more transmitters (step 1312). The method may also include synchronizing the image or video with information regarding the location of at least one of the one or more transmitters for which a signal was received (step 1314), and/or sending, by at least one of the one or more computing devices, information regarding one or more topics or two one or more individuals or entities, such as sending a notification to the referral source that an individual 108 visited a real estate property (step 1316). The order or sequence of at least certain steps shown in FIG. 13 may be modified or rearranged, as desired.

It will be appreciated by those skilled in the art that changes could be made to the embodiments described above without departing from the broad inventive concept thereof. For example, the above-described method is not limited to the order of the steps described herein, as the order of the steps may be modified or rearranged, as desired, and/or certain steps may be added or omitted. It is understood, therefore, that this disclosure is not limited to the particular embodiments identified herein, but it is intended to cover modifications within the spirit and scope of the present disclosure as defined by the appended claims.

What is claimed is:

1. A computer-implemented method comprising:
generating and storing, by a first application that is installed on a mobile device and that is associated with a particular referral source that comprises a provider of a website for searching real estate resources or a mobile application developer, data that references a particular resource that a user of the mobile device has identified as a result of a search of a database of real estate resources;
receiving, by a second application that is installed on the mobile device and that is different than the first application, data indicating that a hardware sensor of the mobile device has detected a short range wireless signal that was transmitted by a portable transmitter that is associated with the particular resource;
determining, by the second application that is installed on the mobile device and that is different than the first application, that the particular resource is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources; and
in response to determining that the particular resource is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources, generating and storing, by the second application that is installed on the mobile device, attribution data that associates (i) the user of the mobile device with (ii) the particular resource and (iii) the particular referral source that is associated with the first application that is installed on the mobile device; and
transmitting by the second application that is installed on the mobile device, the attribution data to a tracking server.

2. The method of claim 1, comprising generating a user interface that identifies referral sources associated with the particular resource and that, for the particular referral source, includes a graphical indicator that indicates that the particular referral source is associated with a physical visit to the particular resource.

3. The method of claim 1, comprising receiving data indicating whether a hardware sensor of a different mobile device that is situated in a particular location has detected the short range wireless signal that is transmitted by the portable transmitter that is associated with the particular resource; and
in response to receiving the data indicating whether the hardware sensor of the different mobile device that is situated in the particular location has detected the short range wireless signal that is transmitted by the portable transmitter that is associated with the particular resource, adjusting a signal transmission parameter associated with the portable transmitter.

4. The method of claim 1, wherein the stored data includes user identifying information entered by the user through the first application that is installed on the mobile device.

5. The method of claim 1, wherein the stored data includes device identifying information placed on the mobile device by a server that is configured to perform searches of the database of real estate resources.

6. The method of claim 1, wherein the stored data further includes (iv) an image of the user that is generated by a camera at a time within a predetermined period of time of the hardware sensor of the mobile device detecting the short range wireless signal transmitted by the portable transmitter that is associated with the particular resource.

7. The method of claim 1, wherein the portable transmitter comprises a beacon.

8. The method of claim 1, wherein the particular resource comprises an indoor portion of a real estate resource.

9. The method of claim 1, wherein the data that references the particular resource that the user of the mobile device has identified as a result of a search of the database of real estate resources comprises a website cookie.

10. The method of claim 1, wherein the portable transmitter comprises a beacon embedded in a light bulb that is located at the particular resource that is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources.

11. A non-transitory computer readable storage medium encoded with a computer program, the program comprising instructions that when executed by data processing apparatus cause the data processing apparatus to perform operations comprising:
generating and storing, by a first application that is installed on a mobile device and that is associated with a particular referral source that comprises a provider of a website for searching real estate resources or a mobile application developer, data that references a particular resource that a user of the mobile device has identified as a result of a search of a database of real estate resources;
receiving, by a second application that is installed on the mobile device and that is different than the first application, data indicating that a hardware sensor of the mobile device has detected a short range wireless signal that was transmitted by a portable transmitter that is associated with the particular resource;
determining, by the second application that is installed on the mobile device and that is different than the first application, that the particular resource is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources; and
in response to determining that the particular resource is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources, generating and storing, by the second application that is installed on the mobile device, attribution data that associates (i) the user of the mobile device with (ii) the particular resource and (iii) the particular referral source that is associated with the first application that is installed on the mobile device; and
transmitting, by the second application that is installed on the mobile device, the attribution data to a tracking server.

12. The medium of claim 11, wherein the operations comprise generating a user interface that identifies referral sources associated with the particular resource and that, for the particular referral source, includes a graphical indicator that indicates that the particular referral source is associated with a physical visit to the particular resource.

13. The medium of claim 11, wherein the operations comprise receiving data indicating whether a hardware sensor of a different mobile device that is situated in a particular location has detected the short range wireless signal that is transmitted by the portable transmitter that is associated with the particular resource; and
in response to receiving the data indicating whether the hardware sensor of the different mobile device that is situated in the particular location has detected the short range wireless signal that is transmitted by the portable transmitter that is associated with the particular resource, adjusting a signal transmission parameter associated with the portable transmitter.

14. The medium of claim 11, wherein the stored data includes user identifying information entered by the user through the first application that is installed on the mobile device.

15. The medium of claim 11, wherein the stored data includes device identifying information placed on the mobile device by a server that is configured to perform searches of the database of real estate resources.

16. The medium of claim 11, wherein the stored data further includes (iv) an image of the user that is generated by a camera at a time within a predetermined period of time of the hardware sensor of the mobile device detecting the short range wireless signal transmitted by the portable transmitter that is associated with the particular resource.

17. The method of claim 11, wherein the portable transmitter comprises a beacon.

18. The medium of claim 11, wherein the data that references the particular resource that the user of the mobile device has identified as a result of a search of the database of real estate resources comprises a website cookie.

19. The medium of claim 11, wherein the portable transmitter comprises a beacon embedded in a light bulb that is located at the particular resource that is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources.

20. A system comprising:
one or more computers and one or more storage devices storing instructions that are operable, when executed by the one or more computers, to cause the one or more computers to perform operations comprising:
generating and storing, by a first application that is installed on a mobile device and that is associated with a particular referral source that comprises a provider of a website for searching real estate resources or a mobile application developer, data that references a particular resource that a user of the mobile device has identified as a result of a search of a database of real estate resources;

receiving, by a second application that is installed on the mobile device and that is different than the first application, data indicating that a hardware sensor of the mobile device has detected a short range wireless signal that was transmitted by a portable transmitter that is associated with the particular resource;

determining, by the second application that is installed on the mobile device and that is different than the first application, that the particular resource is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources; and in response to determining that the particular resource is associated with both (i) the short range wireless signal that was transmitted by the portable transmitter and that was indicated as detected by the hardware sensor of the mobile device, and (ii) the data that was generated and stored by the first application that is installed on the mobile device as a result of the search of the database of real estate resources, generating and storing, by the second application that is installed on the mobile device, attribution data that associates (i) the user of the mobile device with (ii) the particular resource and (iii) the particular referral source that is associated with the first application that is installed on the mobile device; and transmitting, by the second application that is installed on the mobile device, the attribution data to a tracking server.

* * * * *

UNITED STATES PATENT AND TRADEMARK OFFICE
CERTIFICATE OF CORRECTION

PATENT NO.         : 10,019,768 B2
APPLICATION NO.    : 14/634192
DATED              : July 10, 2018
INVENTOR(S)        : Andrew Florance, Curtis Ricketts and Veera Srinivasan It is certified that error appears in the above-identified patent and that said Letters Patent is hereby corrected as shown below:

In the Claims

In Column 10, Line 46, Claim 1, after "transmitting" insert -- , --.

In Column 12, Line 43, Claim 17, delete "method" and insert -- medium --, therefor.

Signed and Sealed this
Second Day of October, 2018

Andrei Iancu
*Director of the United States Patent and Trademark Office*